(12) United States Patent
Villarreal

(10) Patent No.: US 8,703,328 B2
(45) Date of Patent: Apr. 22, 2014

(54) LITHIUM ION BATTERY PACK HAVING PASSIVE COOLING

(75) Inventor: Eric Villarreal, Las Vegas, NV (US)

(73) Assignee: K2 Energy Solutions, Inc., Henderson, NV (US)

( * ) Notice: Subject to any disclaimer, the term of this patent is extended or adjusted under 35 U.S.C. 154(b) by 489 days.

(21) Appl. No.: 12/794,054

(22) Filed: Jun. 4, 2010

(65) Prior Publication Data

US 2010/0310919 A1    Dec. 9, 2010

Related U.S. Application Data

(60) Provisional application No. 61/184,389, filed on Jun. 5, 2009.

(51) Int. Cl.
  *H01M 2/02* (2006.01)
(52) U.S. Cl.
  USPC .......... 429/170; 429/163; 429/164; 429/171; 429/172
(58) Field of Classification Search
  USPC .................... 429/163, 164, 170, 171, 172
  See application file for complete search history.

(56) References Cited

U.S. PATENT DOCUMENTS

| | | | |
|---|---|---|---|
| 4,107,402 A * | 8/1978 | Dougherty et al. | 429/120 |
| 5,543,246 A * | 8/1996 | Treger | 429/90 |
| 6,187,469 B1 * | 2/2001 | Marincic et al. | 429/56 |
| 6,468,692 B1 * | 10/2002 | Nemoto et al. | 429/174 |
| 6,858,344 B2 * | 2/2005 | Marukawa et al. | 429/148 |
| 2004/0143894 A1 * | 7/2004 | Shea | 4/492 |
| 2004/0197642 A1 * | 10/2004 | Sato | 429/158 |
| 2006/0032667 A1 | 2/2006 | Sato | |

FOREIGN PATENT DOCUMENTS

| | | |
|---|---|---|
| CN | 101355144 A | 5/2005 |
| CN | 101079502 A | 11/2007 |
| CN | 101355144 | 7/2010 |
| DE | 102007010744 A1 | 8/2008 |
| DE | 102008034867 A1 | 1/2010 |
| EP | 1333511 A2 | 8/2003 |
| EP | 1883126 A1 | 1/2008 |
| EP | 1921693 A2 | 5/2008 |
| FR | 2903058 A1 | 1/2008 |

OTHER PUBLICATIONS

International Preliminary Report on Patentability for corresponding International Application No. PCT/US10/37453, dated Dec. 6, 2011.
International Search Report and Written Opinion for corresponding International Application No. PCT/US2010/037453, dated Oct. 8, 2010.
First Office Action of corresponding Chinese patent application.

* cited by examiner

*Primary Examiner* — Joseph S Del Sole
*Assistant Examiner* — David N Brown, II
(74) *Attorney, Agent, or Firm* — Stine Law Ltd

(57) ABSTRACT

A lithium ion battery pack battery pack is disclosed. The battery pack comprises a housing, the housing having a sidewall and a sidewall opening extending there through, a plurality of lithium ion battery cells disposed within the housing, the battery cells having an anode terminal and a cathode terminal, first and second current collectors disposed in the housing, the first and second current collectors electrically engaging respective ones of the anode and the cathode terminals, a metal plate disposed in the sidewall opening adjacent one of the current collectors, and an electrically non-conductive barrier disposed between the adjacent one of the current collectors and the metal plate, wherein the metal plate draws heat from the adjacent one of the current collectors outwardly into the ambient environment.

12 Claims, 6 Drawing Sheets

LITHIUM ION BATTERY PACK HAVING PASSIVE COOLING

CROSS-REFERENCE TO RELATED APPLICATION

This application claims the benefit of U.S. Provisional Application Ser. No. 61/184,389, filed on Jun. 5, 2009, the entirety of which is incorporated herein by reference.

TECHNICAL FIELD

This patent relates to high energy density batteries, and more particularly to a lithium ion battery pack having a metal plate, such as aluminum, to draw heat away from internal battery cells and into the ambient environment.

BRIEF DESCRIPTION OF THE DRAWINGS

For a more complete understanding of the disclosure, reference should be made to the following detailed description and accompanying drawings wherein:

FIG. 3a is a perspective view of an underside of a top portion to a battery pack according to an embodiment of the invention

DETAILED DESCRIPTION OF THE INVENTION

Figure 1:
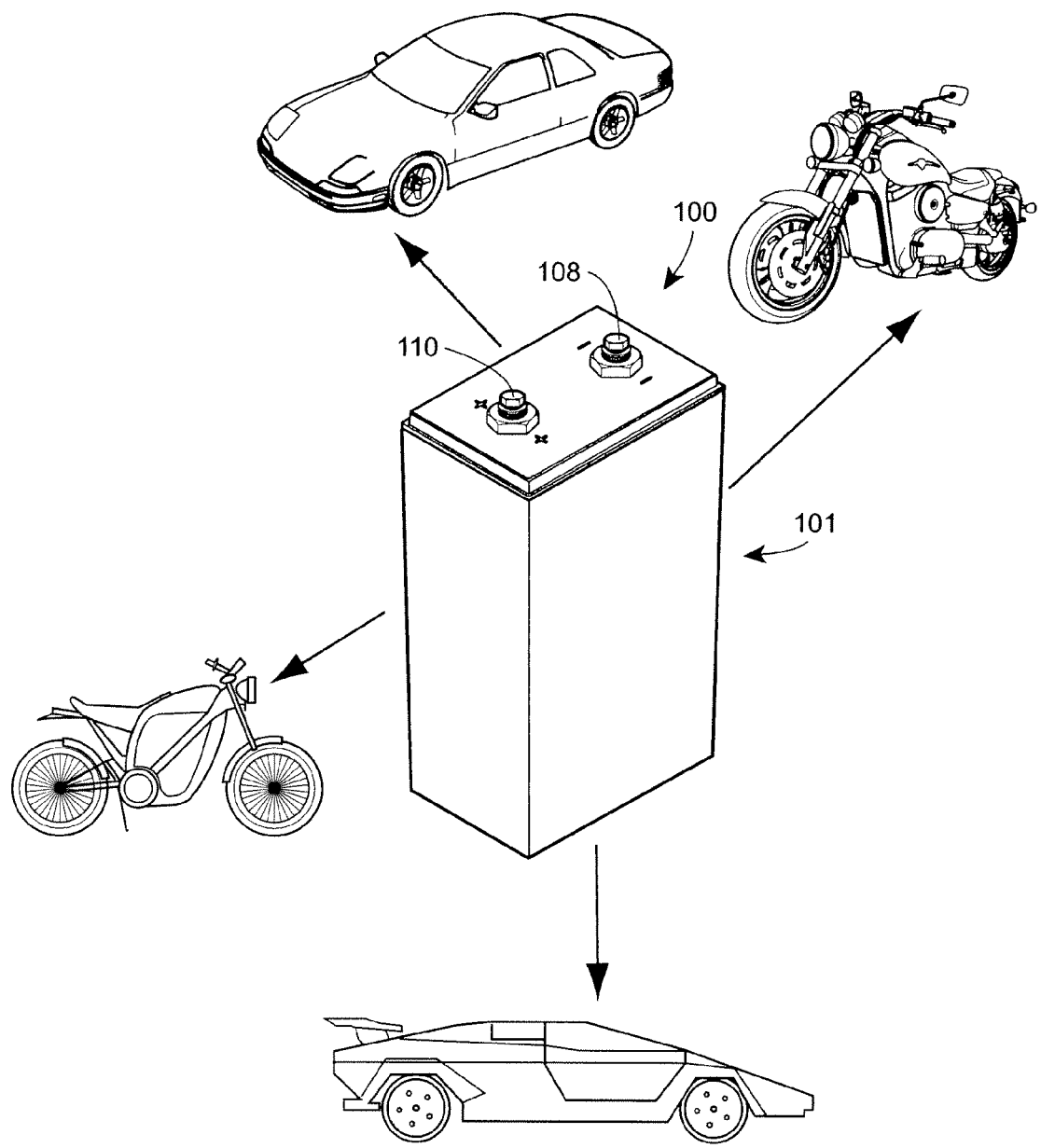
FIG. 1 is a perspective view of a battery pack according to an embodiment of the invention.

While the invention of the present disclosure is susceptible to various modifications and alternative forms, an embodiment is shown by way of example in the drawings and this embodiment will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claim.

A battery pack 100 according to the present invention is illustrated in FIG. 1. The battery pack 100 may be a LiFePO4 battery pack suitable for inclusion in various types of electric vehicles (EVs). Such EVs include automobiles, boats, aerospace vehicles, aviation vehicles, wheelchairs, motobikes, scooters, and the like. The battery pack 100 can also be used in hybrid vehicles (HVs), hybrid electric vehicles (HEVs), plug-in hybrid electric vehicles (PHEVs), and the like.

The battery pack 100 may have a height of about 8.2 inches, a width of about 3.2 inches, and a length of about 4.8 inches, though other dimensions are also contemplated. The total weight of the battery pack 100 may be about 3.0 kilograms, though other weights are also contemplated. The battery pack 100 includes an enclosure 101 with two external terminals 108, 110.

Figure 2:
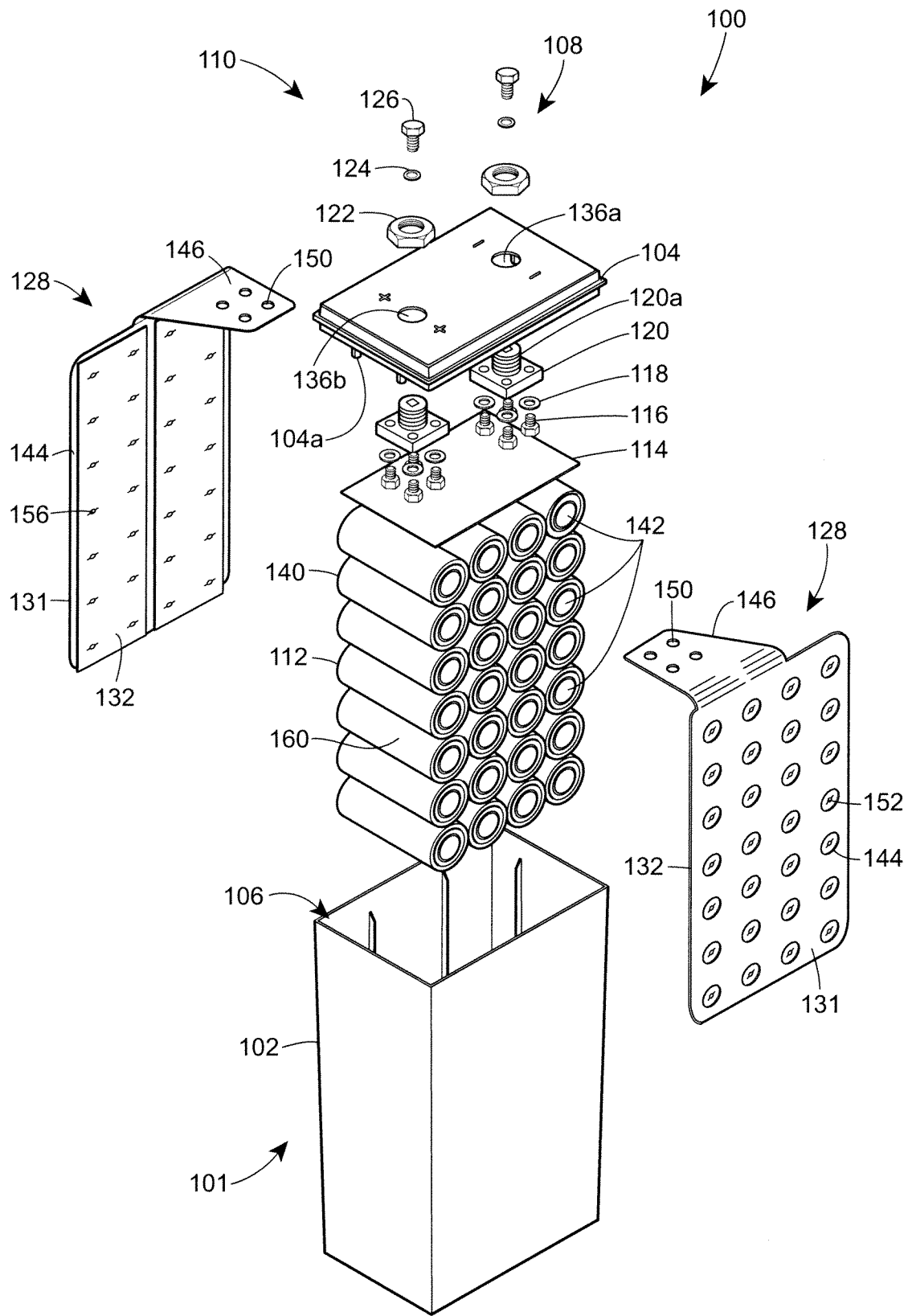
FIG. 2 is an exploded view of the battery pack of FIG. 1.

Now referring to FIG. 2, the battery pack 100 includes twenty-eight cells 112, arranged in parallel and contained in the enclosure 101. Each of the cells 112 may be for example, an EV high energy rechargeable LiFePO4 cell with 3.2 volts and 3200 mAh, model LFP26650EV, as sold by K2 Energy Solutions, Inc, of Henderson, Nev. The battery pack 100 has high energy density, fast recharge times, long cycle life, a flat discharge profile, and is considered to be relatively environmentally friendly. The cells 112 are formed in a cylindrical shape and include a conductive cathode cover 140 and a conductive anode cover 142. It will be understood that other shapes or configurations may be used depending on the application in which the battery pack 100 will be used.

The enclosure 101 includes a housing 102 and a top 104. The top 104 includes two through holes 136a, 136b for receiving the external terminals 108, 110. The through holes 136a, 136b may be formed by a number of methods, including drilling through the top 104. The top 104, which corresponds to an open end 106 of the housing 102, is fixedly attached to the housing 102 in the final assembly after the rest of the components are placed in the housing 102. The top 104 is made of a material such as plastic, though other materials are possible. The top 104 includes tapered tabs 104a which engage the upper row of the cells 112, thereby helping to stabilize the cells 112 within the housing 101.

The housing 102 is generally in the shape of a rectangle, is made of a material similar to that of the top 104 and may be formed by such as a molding process. However, it will be understood that other shapes or configurations are possible. The external terminal 108 is an anode terminal, and the other external terminal 110 is a cathode terminal. The anode and cathode 108, 110 may be electrically coupled to external components (not shown) of an EV. Each of the external terminals 108, 110 includes, for example, a base 120 having a pin 120a, a hex nut 122, a split washer 124, and a hex head cap screw 126.

The battery pack 100 further includes an insulating paper 114 and connecting members 116, 118. The insulating paper 114, which corresponds generally to the shape of the open end 106 of the housing 102, is located below the top 104.

The battery pack 100 includes two current collectors 128. One of the current collectors 128 is an anode current collector and the other current collector 128 is a cathode current collector.

Each of the current collectors 128 includes two collector plate tabs 132, preferably formed of nickel, welded to a collector plate 131. The collector plates 131 may be formed of copper. If copper, the collector plates 131 are ultrasonically welded to the respective collector plate tabs 132. Alternatively the collector plates 131 may be formed of another metal, such as brass. Brass provides a significant cost savings without a significant loss of electrical conductivity. Additionally if the collector plates 131 are formed of brass, they may be resistance welded to the nickel collector plate tabs 132, which may provide further cost savings.

Although one or more of the collector plate tabs 132 could be used, in the present embodiment two are used as they are of a dimension which is commercially readily available.

The collector plate tabs 132 are resistance welded to the cathode and anode covers 140, 142 of the cells 112. Copper and brass provides high electrical and thermal conductivity, and nickel provides corrosion and heat resistance. The use of the collector plate tabs 132 facilitates resistive welding to the cells 112. Also, the use of the collector plate 131 and the collector plate tabs 132 increases the current capacity to the cells 112 without sacrificing the voltage drop over the cells 112. More details about the construction of the current collectors 128 will be described with reference to FIG. 3.

Figure 3:
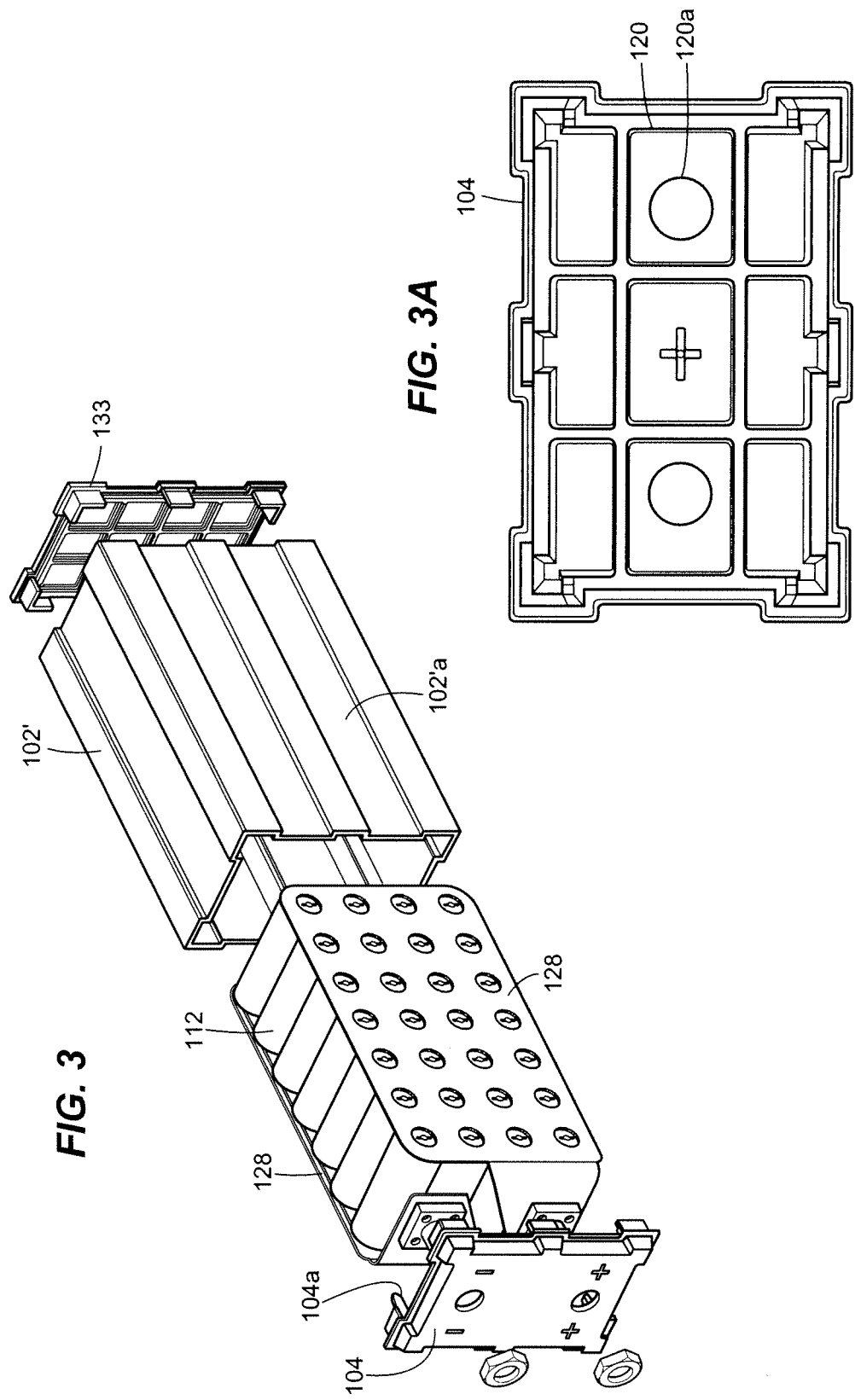
FIG. 3 is an exploded view of an alternative embodiment of a battery pack according to the present invention.

An alternative embodiment of the present invention is illustrated in FIG. 3. In accordance with this embodiment, a housing 102' is formed from an extrusion. This permits greater flexibility in the size of the housing 102', and thus greater flexibility in the number of cells 112 which can be contained within the housing. Rather than having a base integrally molded into the housing, in this embodiment, a discrete base 133 is utilized. Of course, the size of the current collectors 128 will be appropriately determined based upon the number of the cells 112.

Figure 4:
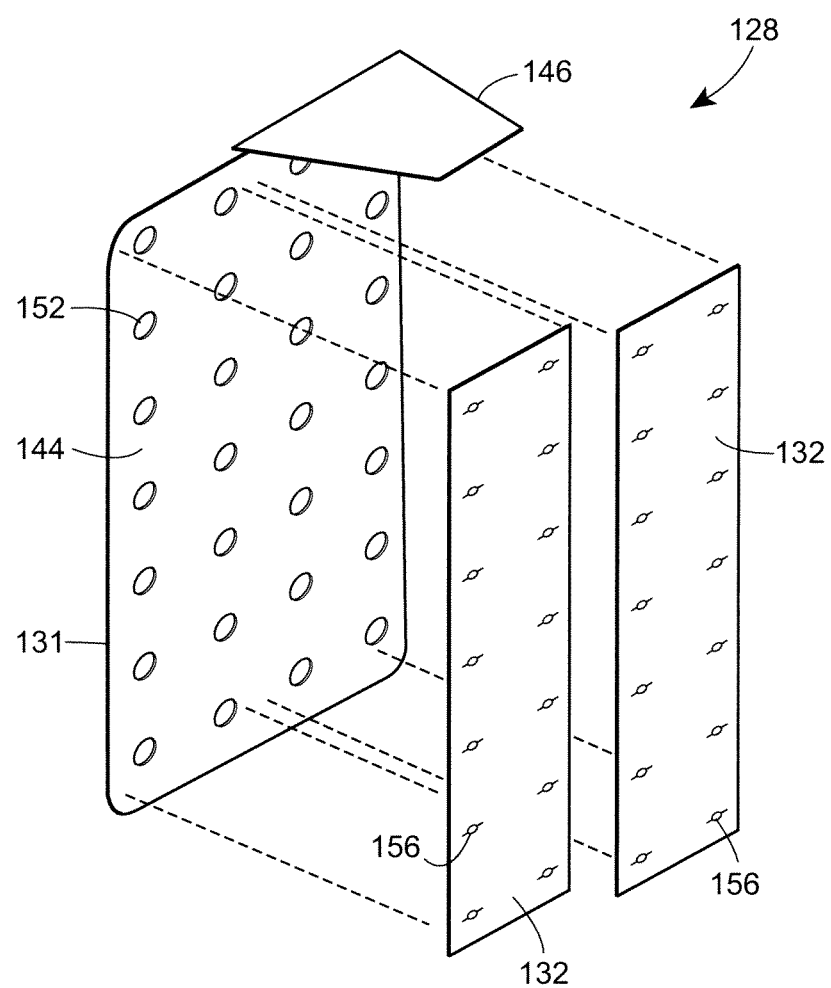
FIG. 4 is an exploded view of a current collector for the battery pack of FIG. 1.

One of the current collectors 128 for the battery pack 100 of FIG. 1 is illustrated in FIG. 4. The current collector 128 includes the collector plate 131 and two collector plate tabs 132. The collector plate 131 is typically fabricated from a flat stock material such as a thin strip of metal, a metal grid or a perforated metal. The use of the collector plate 131 provides high electrical and thermal conductivity to the cells 112. The collector plate 131 includes a body portion 144 and a tab 146. The tab 146 with an approximately 90 degree bend is formed during a bending operation. As shown, the tab 146 is bent toward the body portion 144 of the collector plate 131. The body portion 144 is generally rectangular in shape and corresponds to the housing 102 of the battery pack 100, however other known shapes or dimensions are possible. The body portion 144 of the collector plate 131 includes twenty-eight holes 152, corresponding to the number of cells 112 used in the battery pack 100 (FIG. 2). The holes 152 are also aligned with and mated with the cathode and anode covers 140, 142 of the cells 112. The holes 152 may be generally circular in shape, though other shapes or configurations are contemplated. Each of the holes 152 may have a dimension of about 0.50 inches, though other dimensions are also contemplated. Holes 150 which have a dimension smaller than the dimension of the holes 152 are introduced on the tab 146 of the collector plate 131 for receiving the connecting members 114, 116 (FIG. 2). The holes 150, 152 may be formed by a number of methods, including drilling through the collector plate 131.

Additionally if the collector plate 131 is formed of brass, the external terminals 108, 110 may be resistance welded to the tab 146, thereby eliminating the need for hardware to secure the external terminals 108, 110 to the tab 146. Further as illustrated in FIG. 3, the underside of the top 104 is ribbed which keys the base 120 of the external terminals, restricting rotation thereof when connecting to external terminals 108, 110 to external components.

The housings 102' is shaped to provide longitudinal recesses 102'a. These recesses provide structural integrity as well as provide passages between adjacent ones of the battery packs 100 to permit passage of cooling air as well as straps (not shown).

As discussed above, the current collector 128 includes two collector plate tabs 132. The collector plate tabs 132 are typically fabricated from a flat stock material such as a thin strip of metal. The use of the collector plate tabs 132 provides corrosion and heat resistances effect to the cells 112. Each of the collector plate tabs 132 includes fourteen holes 156. The holes 156 are aligned with and mated with the holes 152 of the collector plate 131. The holes 156 of the collector plate tabs 132 may be generally round, with opposing slots to help align the current collectors 128 with the cathode and anode covers 140, 142, of the cells 112, during manufacture. Each of the holes 156 has a dimension smaller than the dimension of the holes 152 of the collector plate 131, though other dimensions are also contemplated. The holes 156 may be formed by a number of methods, including drilling through the collector plate tabs 132.

The collector plate tabs 132 are ultrasonically welded to the collector plate 131. The use of the collector plate tabs 132 permits resistive welding of the collector plate 131 via the collector plate tabs 132 to the cathode and anode covers 140, 142 of the cells 112. Also, the current collector 128 having the collector plate 131 and the collector plate tabs 132 increases the current capacity to the cells 112 and from an external generator (not shown) of the EV without sacrificing the voltage drop over the cells 112.

Figure 5:
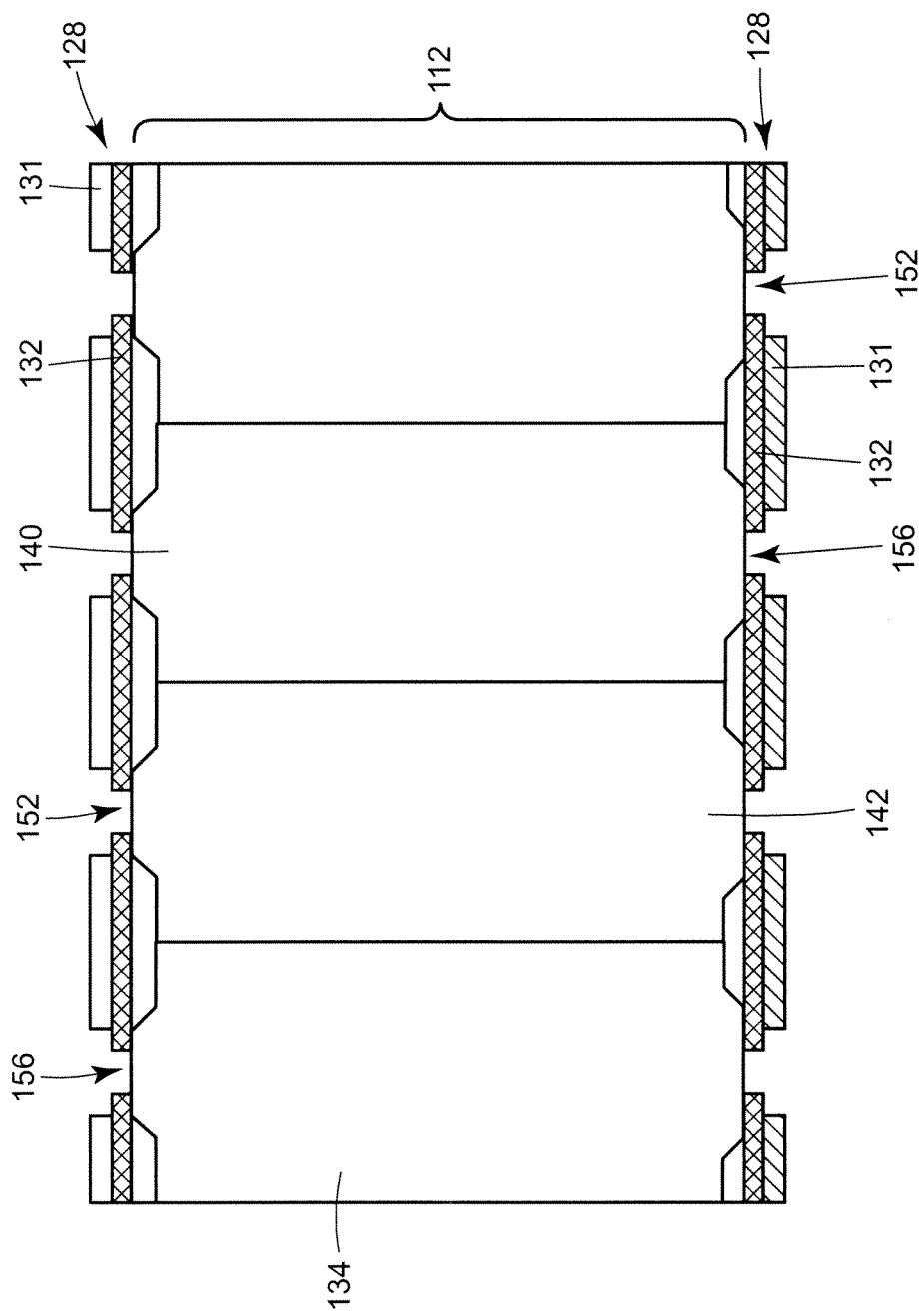
FIG. 5 is a partial cross-sectional view of the battery pack of FIG. 1.

FIG. 5 depicts a partial cross-sectional view of the battery pack 100. Only the current collectors 128 and a row of four cells 112 are illustrated. Two collector plate tabs 132 are ultrasonically welded to the collector plate 131 and in turn the collector plate tabs 132 are resistance welded to the cathode and anode covers 140, 142 of the cells 112. The through holes 152 of the collector plates 131 are aligned with and mated with the through holes 156 of the collector plate tabs 132 and the cathode and anode covers 140, 142 of the cells 112.

The method of constructing the battery pack 100 of the present invention is as follows. First, the cells 112 are arranged in parallel. To hold the cells 112 in place, an adhesive such as glue (not shown) is applied to the body of the cells 112 to join the cells 112 together. The collector plate tabs 132 are placed side by side and are ultrasonically welded to respective ones of the body portion 144 of the collector plates 131 such that the holes 156 of the collector plate tabs 132 are aligned with and mated with the holes 152 of the collector plate 131. Next, the tabs 146 of the collector plates 131 are fixedly attached to the pins 120 of the terminals 108, 110 via the connecting members 116, 118. There are a number of ways to secure the tabs 146 in place, including fastening the tabs 146 to the pins 120 of the terminals 108, 110 using for example split washer 118 and screw 116. The insulating paper 114 is placed over the first row of the cells 112. Next, the collector plate tabs 132 are resistance welded to the cathode and anode covers 140, 142 of the cells 112. The cells 112 attached to the current collectors 128 are placed inside the housing 102. The top 104 is joined to the housing 102 to seal the open end 106 of the housing 102. The hex nuts 122, the split washers 124, and the cap screws 126 of the terminal 108, 110 are fixed attached to the current collectors 128. In this position, the battery pack 100 is formed and is in electrical connection with the external components (not shown) of the EV via the terminals 108, 110.

The individual cells 112 are electrically isolated from each other by a cardboard sleeve 160 (see FIG. 2). Although the cells 112 are connected in parallel, the cardboard sleeve 160 provides some mechanical compliance to the battery assembly that lets the assembly accommodate thermal expansion as well as isolates adjacent ones of the cells 112 from one another during vibration.

Figure 6:
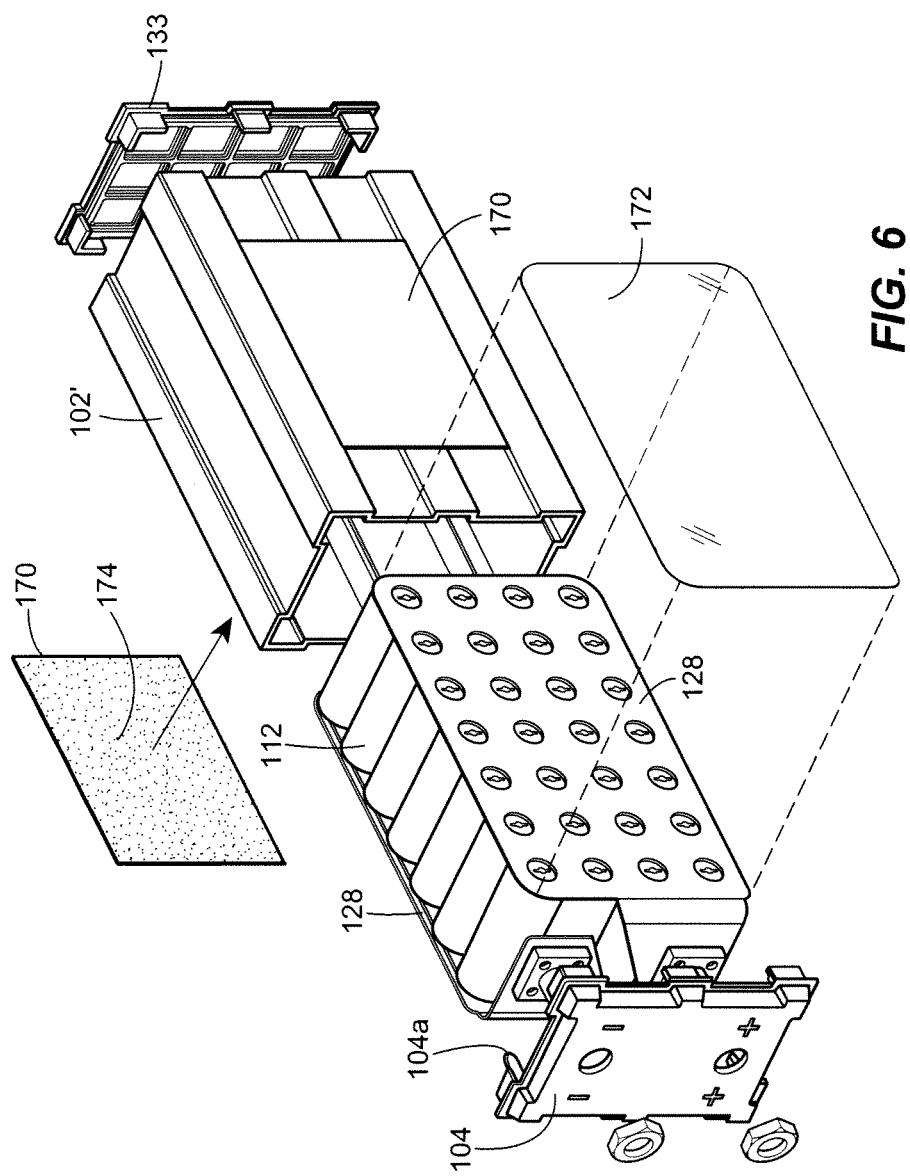
FIG. 6 is an exploded view of a further alternative embodiment of a battery pack according to the present invention.

A further embodiment of the invention is illustrated in FIG. 6. According to this embodiment, an opening is provided through opposing sidewalls of the housing 102', and heat conducting metal plates 170, such as of aluminum, are placed therein to draw heat away from the cells 112. Electrically non-conductive barriers electrically isolate the cells 112 from the plate 170. The barriers may be a polyester film 172, such as a Mylar film, disposed on the outer surface of the collector plates 131. Resistance welding the collector plates 131 to the collector plate tabs 132 results in a smoother outer surface of the collector plates 131. Smoother outer surfaces of the collector plates 131 may better protect the integrity of the polyester film 172 adjacent thereto. Alternatively the barriers may be a surface treatment 174, formed such as by anodizing or powder coating the plates 170 on the side facing the cells 112.

It will be appreciated that numerous variations to the above-mentioned approach are possible. Variations to the above approach may, for example, include performing the above steps in a different order.

Preferred embodiments of this invention are is described herein. It should be understood that the illustrated embodiments are exemplary only, and should not be taken as limiting the scope of the invention.

The invention claimed is:

1. A lithium ion battery pack comprising:
    A housing, the housing having a base, a top, opposed sidewalls, and a sidewall opening extending through said sidewall;
        a plurality of cylindrical lithium ion battery cells disposed within the housing, the battery cells being arranged in parallel in plural rows and each having an anode cover facing one of said opposed sidewalls and a cathode cover facing the other of said opposed sidewalls, each battery cell being contained within a respective sleeve, wherein the sleeves are joined together and wherein the sleeves serve to isolate the associated battery cells electrically from adjacent battery cells in adjacent rows and columns;
    first and second sheet current collectors, the first and second current collector respectively electrically engaging and being in thermal contact with the anode terminals and the cathode terminals and being disposed in the housing adjacent respective ones of said opposed sidewalls;
    a metal plate covering the sidewall opening adjacent one of the current collectors, and
    an electrically non-conductive barrier disposed between the adjacent one of the current collectors and the metal plate, the electrically non-conductive barrier comprising either a polyester film or a surface coating on the plate side facing the one of the current collectors, wherein the metal plate draws heat from the said adjacent one of the current collector outwardly, through the barrier, into the ambient environment.

2. The battery pack of claim 1 wherein the metal plate is aluminum.

3. The battery pack of claim 1 wherein the electrically non-conductive barrier comprises the polyester film.

4. The battery pack of claim 1 wherein the electrically non-conductive barrier comprises the surface coating.

5. The battery pack of claim 4 wherein the surface coating comprises a powder coating.

6. The battery pack of claim 4 wherein the surface coating comprises an anodized layer.

7. The battery pack of claim 1 wherein the housing has a second sidewall opening extending through a second sidewall, the battery pack further including a second metal plate covering the second sidewall opening adjacent the other one of the current collectors, a second electrically non-conductive barrier disposed between the other one of the current collectors and the second metal plate, the second electrically non-conductive barrier comprising either a polyester film or a surface coating on the plate side facing the other one of the current collector wherein the second metal plate draws heat from the other one of the current collectors outwardly through the second barrier, into the ambient environment.

8. The battery pack of claim 7 wherein the second metal plate is aluminum.

9. The battery pack of claim 7 wherein the second electrically non-conductive barrier comprises the polyester film.

10. The battery pack of claim 7 wherein the second electrically non-conductive barrier comprises the surface coating.

11. The battery pack of claim 10 wherein the surface coating comprises a powder coating.

12. The battery pack of claim 10 wherein the surface coating comprises an anodized layer.

* * * * *